Dec. 18, 1928.  
H. A. McGUNNIGLE  
1,695,556  
APPARATUS FOR PROJECTING LIGHT  
Filed April 21, 1926
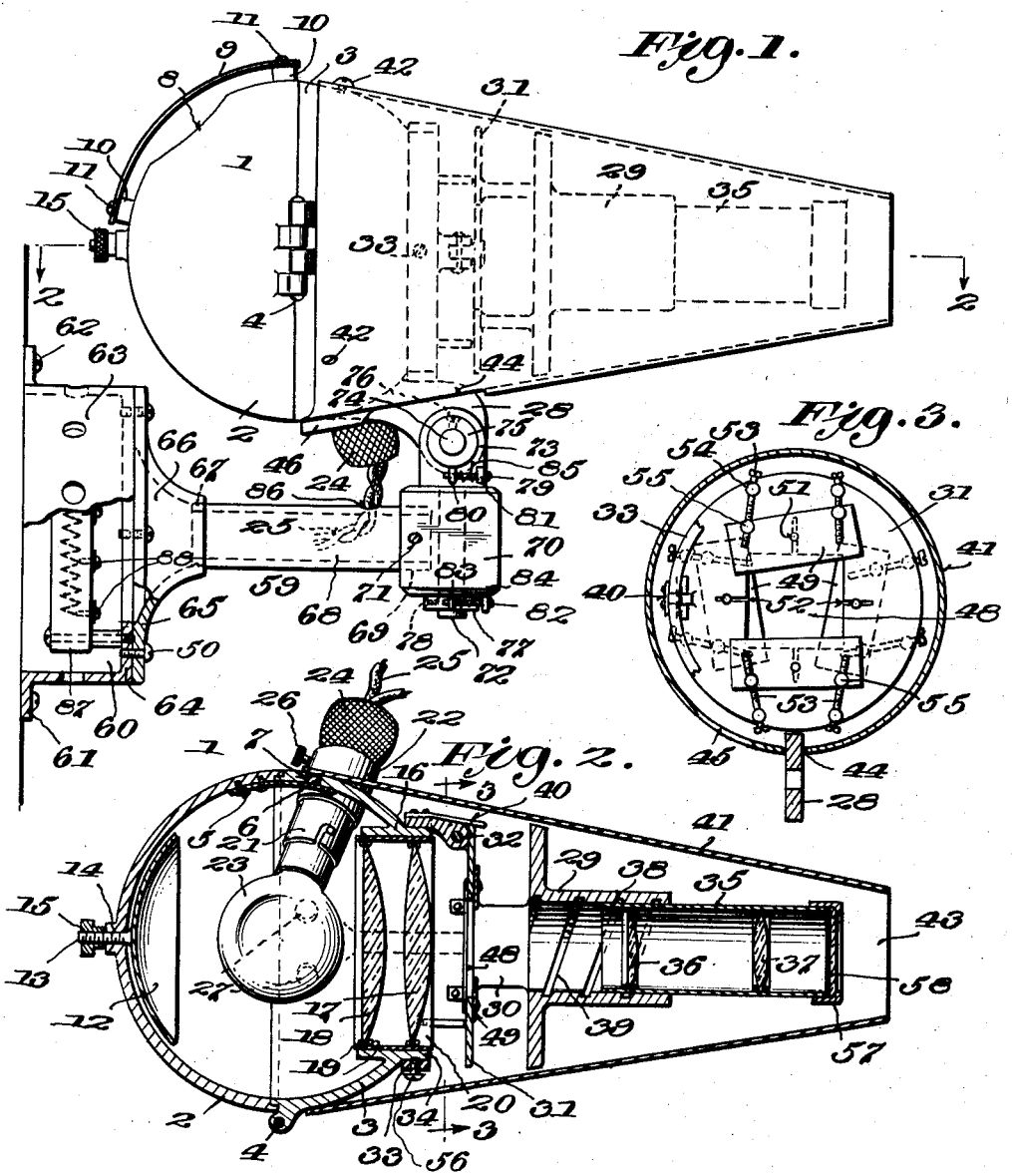
Inventor  
Harold A. McGunnigle,  
By Clair M. Whitman  
Attorney Patented Dec. 18, 1928.

1,695,556

UNITED STATES PATENT OFFICE.

HAROLD A. McGUNNIGLE, OF NEW YORK, N. Y., ASSIGNOR TO ARTLITE, INC., OF NEW YORK, N. Y., A CORPORATION OF NEW YORK.

APPARATUS FOR PROJECTING LIGHT.

Application filed April 21, 1926. Serial No. 103,546.

This invention relates to an improved method for illuminating a field of vision and more particularly to a method of illumination adapted to produce a uniform distribution of light of any desired intensity, color, or shape on the field of vision or an object therein.

The present invention although applicable to ordinary purposes such as the projection of an image of an object upon a screen or other surface including stereopticon views, motion pictures and advertisements, and the projection of a beam of light for theatrical, dental or surgical uses, is especially applicable to the ilumination of a field of a given shape and size such as works of art including framed pictures, paintings, portraits, tapestries and statuary, or commercial apparatus such as advertising signs, display windows, exhibits, counters, etc.

The method now in general use for illuminating a field or object of a given shape or size have been either to place a light or border of lights shielded by reflectors adjacent to or encompassing the object or to position a flood light at a distant point and project a beam of light on the object. These methods although effective in concentrating the light on the object and in increasing the intensity of illumination are inefficient in many respects.

If the single light or border of lights equipped with reflectors are used, the object or surface near each light is more intensely illuminated resulting in an uneven distribution of light causing glare, reflections, dark spots and other undesired effects. The substitution of the flood light to overcome the defective distribution of light introduces other detrimental effects, such as over-illumination of the object and surrounding objects, deep shadows and general illumination of the space in front of the field of vision by reflected light. Furthermore, both of the above described methods require a considerable amount of electrical energy for their operation mainly because the lamps used must be of high candle-power rating in order to illuminate the object at the desired intensity. These lamps, particularly the high wattage units of the gas-filled type, operate at rather high temperatures and, therefore, introduce the problem of ventilation to dissipate the heat for the safe installation of this type of unit.

The most pleasing effects to the eye are obtained if the distribution of light over the illuminated field is uniform, of moderate intensity and in some cases of a color to harmonize with the object; the light being projected, ordinarily, from a single source positioned in front of the field and preferably above and at an angle to the line of sight. These effects are further enhanced if the beam of light is so shaped as to confine the illumination to the exact outline of the object or to a specified portion thereof. The illumination of a framed painting, for example, is more effective if the field of light is confined to the picture and frame or to the painting on the canvas leaving the frame thereof in the surrounding shadow, and in like manner a piece of statuary may be illuminated without casting a shadow thereof on the floor or walls in the background. Other pleasing effects may be produced by the use of colored screens interposed between the source of light and the object, as for example, to provide an amber colored light for a landscape painting or picture, a red light for a sunset scene, a blue light for a water scene, or a color simulating daylight for the many commercial uses where artificial daylight is necessary.

Other practical applications of the present invention will readily suggest themselves to those skilled in the art to which this invention appertains.

The primary object of the present invention is, therefore, to illuminate a field of vision or an object in such manner as to ensure a uniform distribution of light of any desired intensity over the illuminated area for the most effective and pleasing results.

Another object of the invention is to illuminate a field of vision or an objcet of any desired shape and/or size with a uniform, unvarying intensity.

A further object is to illuminate a field of vision or an object of any desired shape or size with a uniform, unvarying intensity by a projected beam of light.

Another object is to produce a uniform distribution of light of any desired intensity, shape and/or color on the field of vision or an object from one or more projected beams of light.

Another object is to produce a uniform distribution of light of any desired intensity, shape, and/or color on the field of vision or an object from one or more beams of light projected at an angle to the plane of said field or object.

And another object is to control the cross-section of a projected beam of light adjacent its source whereby to permit a variation in the size and/or shape of the illuminated field.

Other objects and advantages of the invention will be apparent from the following description.

The preferred embodiment of means for carrying out the above-described method in a simple, practical manner consists of an optical projecting apparatus which is compact, portable, easily operated, inexpensive in construction and operation and contained in a complete unitary structure having incorporated therein an improved light shielding and excluding means constructed and adapted to control the cross-section of the projected beam of light in an improved and efficient manner, and adjusting means constructed and adapted to permit the relative adjustment of the various parts of the apparatus for the most effective use of the source of light.

Other objects and uses relating to specific parts of the apparatus will be brought out in the following description, reference being had to the accompanying drawings forming a part of this specification, wherein like reference characters indicate corresponding parts in the several views and wherein:—

Figure 1 is a side elevation of the complete light projector mounted in operative position on its universally adjustable bracket;

Figure 2 is a sectional plan view of the light projector taken on the line 2—2, in Fig. 1;

Figure 3 is a sectional elevation thereof taken on the line 3—3, in Figure 2, and showing the accurately adjustable light shield or diaphragm mounted in operative position therein; and Figure 4 is a wiring diagram of the electrical connections to the lamp and the regulator unit.

Referring to the accompanying drawings, which illustrate the present preferred embodiment of the invention, the light projecting apparatus comprises a two-part lamp housing 1, preferably spherical in shape, consisting of a rear shell 2 hinged at 4 to a forward shell 3 and carrying a spring latch 5 provided with a button 6 releasably engaged in an aperture 7 in the shell 3, the hinge 4 and latch 5 being diametrically opposite on the horizontal transverse axis through the center of the housing 1. This construction is simple and permits ready access to the interior of the lamp housing. The rear shell 2 is provided with a relatively large ventilating opening 8 in the upper portion thereof which is covered by a combined light shield and dust guard in the form of a curved plate 9 mounted on and spaced from the shell wall by the spacers 10 and screws 11.

A parabolic reflector 12 is supported within the rear shell 2 by a threaded and slotted stud 13 engaging a tapped hole 14 in the shell wall on the focal axis of the apparatus, the stud projecting beyond the wall far enough to receive a clamping nut 15. With this arrangement the reflector may be adjusted toward or away from the center of the housing merely by rotating the reflector in opposite directions and then locked in any desired position of adjustment by its clamping nut 15.

A tubular condenser lens support 16 is carried by the forward shell 3, being preferably formed integral with the shell wall in such position that its longitudinal axis coincides with the focal axis of the apparatus. Within this support are mounted the condensing lens, or preferably a combination of lenses consisting of an outer double-convex lens 17 and an inner plano-convex lens 18, which are retained in operative position by the spring wires 19, within the sleeve 20, as clearly shown in Fig. 2.

A lamp socket 21, which may be of the automobile head light type, is slidably mounted in a sleeve 22 rigidly secured in an opening in the forward shell 3, the central axis of the sleeve being radially offset from the vertical axis of the housing. A lamp 23, which may be of the low-voltage automobile type, is removably secured in the bayonet joint of the socket with its filament at the focus of the reflector 12. A bushing 24 on the other end of the socket serves to enclose the terminal connections of the flexible cord 25 and limit the inward movement of the socket in the sleeve. A set screw 26 in the sleeve is adapted to secure the lamp in adjusted position. With this construction the lamp may be moved in or out or rotated to accurately position the filament at the focal point of the reflector.

The shell 3 is also provided with the lower ventilating openings 27 in the rear portion thereof, and a depending supporting lug 28 below the center of gravity of the unit.

A projector lens casing 29 in the form of a flanged tube is supported in operative position in front of the condenser lens support 16 by a bracket 30 carried by an upright apertured disk 31 hinged at 32 to a ring 33 rotatable on the flange 34 of the lens support 16.

A tubular lens holder 35 carrying a combination of projector lenses 36 and 37 is rotatably mounted in the casing 29 and is axially movable therein by means of a lug 38 riding in a spiral groove 39 in the interior wall of said casing. The lenses 36 and 37 are, respectively, of the plano-convex and double convex type for wide angle projection, but other forms of lenses may be substituted depending on the distance to the field of vision. The casing 29 is releasably held either in its operative or "swung-out" position by means of the flat spring 40 riveted on the hinge 32 and contacting with the adjacent edge of the disk 31, as shown in Figure 2.

A removable conical cover 41 is arranged to enclose the lens mountings and associated parts and serves the double purpose of protecting them from dust or damage and intercepting stray light rays from the lenses and thereby concealing the source of the projected beam of light. It also imparts a neat and pleasing appearance to the assembled unit as it is designed to snugly fit the periphery of the forward shell 3 near the edge abutting the rear shell 2, being held in place by the set screws 42, and extends forwardly at a uniformly decreasing taper to terminate a short distance beyond the outer end of the lens holder 35 in an opening 43 slightly larger than that in said holder. The cover is slotted at 44 and 45 to pass the lug 28 and lamp socket sleeve 22 and is also deformed to provide lateral ventilating ducts 46 over the ventilating openings 27.

The hinged upright disk 31 which supports the projector lens casing 29 also carries an adjustable light shield shown in Figures 2 and 3. The disk is provided with a central square aperture 48 and a plurality of adjustable slides or plates 49 movable inwardly toward the center of said aperture, being adapted to reduce the effective size of the aperture or alter its effective shape. In other words, a square beam of light may be projected through the aperture when the slides are withdrawn beyond the inner edges of the disk but with proper manipulation of four overlapping, straight-edge slides, the cross-section of the beam may be reduced or made rectangular, oblong, rhomboidal or triangular. This adjustment is accomplished by the use of four substantially rectangular plates 49 centrally supported on the disk 31 adjacent the aperture 48 by headed guide pins 51 secured to the plates and slidable in transverse slots 52 in the disk. Adjusting screws 53 are rotatably mounted in posts 54 swivelled to the disk 31 and threadedly engage the posts 55 swivelled to the plates 49 near the outer corners thereof, as shown. One pair of slides are positioned on one face of the disk and the other pair on the other face thereof as shown by the dotted lines in Figure 3, the four slides being uniformly spaced about the aperture 48. For a more detailed disclosure of the construction and operation of the adjustable light shield and modifications thereof, reference may be had to my copending application, Serial No. 103,547, filed April 21, 1926. In operating the light shield or diaphragm the plates 49 may be moved toward or away from the center of the aperture 48 or set at an angle to the walls of the aperture by turning the adjusting screws 53 in the respective posts 54 and 55, thus reducing or altering the cross-section of the beam of projected light between the condensing and projecting lenses by very small degrees and thereby accurately controlling the size and shape of the field of vision and maintaining the parts in the desired position of adjustment. In addition, the light shield may be rotated as a unit by loosening the set screw 56 and shifting the ring 33 on the flange 34.

A removable color screen in the form of an apertured cap 57 carrying the colored transparency 58 may be positioned to frictionally engage the forward end of the lens holder 35, if desired.

As previously mentioned, the forward shell 3 of the lamp housing 1 is provided with a depending supporting lug 28 located preferably beneath the center of gravity of the assembled unit. A novel form of bracket 59 has been designed for universally mounting the unit for adjustment in any desired position on a flat or other surface, and since this bracket has a general application and may be used to support various devices at any angle to the horizontal or vertical plane, it has been made the subject of a separate application, Serial No. 111,504, filed May 25, 1926, by A. E. Corbin and W. R. Palmer, to which reference may be had for a full disclosure of its construction, operation, and advantages. The bracket 59 shown in side elevation in Figure 1, comprises a hollow base 60 of any suitable shape, preferably round, having one or more outstanding lugs 61 apertured to receive suitable mounting screws or bolts 62 and an apertured side wall 63. The bottom of the base is open but the top thereof is partially closed as by the flange 64. A cover plate 65 fits on the top of the base being secured to the flange 64 by the machine screws 50, as shown, and has a central portion formed with an outwardly tapering extension 66 terminating in a threaded opening 67. A pipe or conduit 68 of any desired length has one end threaded in this opening and its other end slidably fitted in a recess 69 in a bearing block 70, the parts being held together by the set screw 71. The bearing block is bored out on its vertical axis to rotatably receive shank 72 of the shackle 73 which engages the lug 28 of the unit. A bolt 74 extends through aligned openings in the shackle and lug and is held in place by the collar 75 and its set screw 76. A similar collar 77 with its set screw 78 is mounted on the lower end of the shank 72 of the shackle 73 in contact with the adjacent face of the bearing block. A tangent screw 79 mounted in the lugs 80 and 81 which are secured, respectively, to the collar 75 and shackle 73 provide a fine adjustment in a vertical plane, and a tangent screw 82 mounted in the lugs 83 and 84 which are secured, respectively, to the collar 77 and the bottom face of the bearing block provide a fine adjustment in a horizontal plane. A small coil spring 85 is placed around each tangent screw to take up back lash between the adjustable members. However, by loosening the set screws in the collars 75 and 77, the light projector unit may be freely rotated on the shank 72 or the bolt 74 to an approximate position of adjustment.

A side opening 86 in the conduit 68 permits the flexible cord 25 from the lamp to be carried through the conduit and cover plate 65 into the hollow base 60, and there connected to the terminals 88 of a resistance unit or small transformer 87 mounted therein when the lamp voltage is less than that of the lighting circuit. It will be understood, however, that the construction of the base 60 or of the cover plate 65 may be varied in any desired manner, as by adapting either or both for mounting directly on any type of junction or outlet box used in electrical wiring installations.

It is also within the preview of the present invention to construct the plate 49 of the adjustable light shield of any desired shape, regular or irregular, and of any suitable material, either opaque, translucent, colored, or a combination of the above materials to suit the conditions, and to provide other supporting and fine adjustable means than those disclosed herein.

In operation, the light rays from the lamp filament are concentrated by the reflector 12 in the lamp housing 1 on the condensing lenses 17 and 18 therein and projected horizontally or axially through the aperture 48 in the disk 31 to the lens holder 35, passing through the projector lenses 36 and 37 to the field of vision or object to be illuminated in a manner known to those skilled in the art. The cross-section of the beam of light may be altered to any desired extent within the limits of the aperture 48 and to any degree of accuracy by the adjusting means on the slides 49, thus controlling the exact field of vision or area of illumination. By removing the cover 41 and swinging the disk 31 and attached parts on the hinge 32, a preliminary adjustment of the slides and projecting lens may be conveniently made.

It will be obvious that various changes may be made in details of construction without departing from the spirit of this invention, and it is, therefore, to be understood that this invention is not to be limited to the specific construction shown and described.

What I claim is:

1. An apparatus of the class described including a source of light, an optical lensing system for projecting a beam of light from said source, a light shield associated with said lensing system and including a centrally apertured support through whose aperture the light beam is adapted to pass, a plurality of plate-like members carried by said support and adjustable in planes parallel to that of the support about said aperture, and means for independently adjusting said members relative to each other.

2. An apparatus of the class described including a source of light, spaced lens arranged in groups and disposed in aligned relation one with respect to the other, for projecting a light beam from said source, a light shield interposed between the lens groups and having an aperture therein through which the light beam is adapted to pass, means for adjusting one group of lens relative to the other group thereof and to said light shield, a plurality of plate-like members carried by said light shield and adjustable in planes parallel to that of the same about said aperture, and means for independently adjusting said members relative to each other.

3. An apparatus of the class described including a source of light, an inner group of aligned lens, an outer group of aligned lens disposed in line with said inner group of lens for projecting a light beam from said source, a light shield interposed between said inner and said outer groups of lens and having an aperture therein through which the light beam is adapted to pass, a plurality of plate-like members carried by said shield and adjustable in planes parallel to that of the same about said aperture, means for adjusting said outer group of lens relative to said inner group of lens and to said light shield, and means for independently adjusting said members relative to each other.

4. An apparatus of the class described including a source of light, a casing enclosing said light source and having a light beam projecting orifice therein, an inner group of aligned lens supported in position adjacent said light source, an outer group of aligned lens supported immediately inward of the projecting orifice of said casing and in line with the lens of said inner group of the same, a light shield supported in interposed position between said inner group of lens and said outer group of lens and having an aperture therein disposed in alignment with the lens of both groups thereof, a plurality of plate-like members carried by said shield and adjustable in planes parallel to that of the same about said apertures, means for adjusting said outer group of lens relative to said inner group of lens and to said light shield, and means for independently adjusting said members relative to each other.

5. An apparatus of the class described including a source of light, a casing enclosing said light source and having a light beam projecting orifice therein, an inner group of aligned lens supported in position adjacent said light source, an outer group of aligned lens supported immediately inward of the projecting orifice of said casing and in line with the lens of said inner group of the same, a light shield supported in interposed position between said inner group of lens and said outer group of lens and having an aperture therein disposed in alignment with the lens of both groups thereof, a plurality of plate-like members carried by said shield and adjustable in planes parallel to that of the same about said aperture, means for adjusting said outer group of lens relative to said inner group of lens and to said light shield, means for independently adjusting said members relative to each other, and means for adjustably supporting said casing in a desired position of operation.

6. An apparatus of the class described including a source of light, an optical lensing system for projecting a beam of light from said light source, a centrally apertured member associated with said lensing system through which the light beam is adapted to pass, a plurality of plate-like members carried by said apertured member and adjustable in planes parallel to that of the latter about the aperture therein, and means for independently adjusting said plate-like members relative to each other.

In testimony whereof I affix my signature.

HAROLD A. McGUNNIGLE.